(12) United States Patent
Shpunt et al.

(10) Patent No.: US 9,131,136 B2
(45) Date of Patent: Sep. 8, 2015

(54) LENS ARRAYS FOR PATTERN PROJECTION AND IMAGING

(75) Inventors: Alexander Shpunt, Tel Aviv (IL); Benny Pesach, Rosh Ha'ayin (IL)

(73) Assignee: APPLE INC., Cupertino, CA (US)

(*) Notice: Subject to any disclaimer, the term of this patent is extended or adjusted under 35 U.S.C. 154(b) by 558 days.

(21) Appl. No.: 13/311,584

(22) Filed: Dec. 6, 2011

(65) Prior Publication Data
US 2012/0140109 A1    Jun. 7, 2012

Related U.S. Application Data

(60) Provisional application No. 61/419,891, filed on Dec. 6, 2010.

(51) Int. Cl.
*H04N 5/232* (2006.01)
*H04N 5/225* (2006.01)

(52) U.S. Cl.
CPC .................. *H04N 5/2254* (2013.01)

(58) Field of Classification Search
USPC .............. 348/36, 164, 169, 272, 273, 345
See application file for complete search history.

(56) References Cited

U.S. PATENT DOCUMENTS

| | | | |
|---|---|---|---|
| 3,796,498 A | 3/1974 | Post | |
| 4,336,978 A | 6/1982 | Suzuki | |
| 4,542,376 A | 9/1985 | Bass et al. | |
| 4,802,759 A | 2/1989 | Matsumoto | |
| 4,843,568 A | 6/1989 | Krueger et al. | |
| 4,850,673 A | 7/1989 | Velzel et al. | |
| 5,075,562 A | 12/1991 | Greivenkamp et al. | |
| 5,406,543 A | 4/1995 | Kobayashi et al. | |
| 5,477,383 A | 12/1995 | Jain | |
| 5,483,261 A | 1/1996 | Yasutake | |
| 5,606,181 A | 2/1997 | Sakuma et al. | |
| 5,630,043 A | 5/1997 | Uhlin | |
| 5,636,025 A | 6/1997 | Bieman et al. | |
| 5,648,951 A | 7/1997 | Kato et al. | |
| 5,691,989 A | 11/1997 | Rakuljic et al. | |
| 5,712,682 A | 1/1998 | Hannah | |
| 5,742,262 A | 4/1998 | Tabata et al. | |

(Continued)

FOREIGN PATENT DOCUMENTS

| CN | 1725042 A | 1/2006 |
|---|---|---|
| DE | 19736169 A1 | 8/1997 |

(Continued)

OTHER PUBLICATIONS

Fienup, J.R., "Phase Retrieval Algorithms: A Comparison", Applied Optics, vol. 21, No. 15, Aug. 1, 1982.

(Continued)

*Primary Examiner* — Roberto Velez
*Assistant Examiner* — Yih-Sien Kao
(74) *Attorney, Agent, or Firm* — D. Kligler I.P. Services Ltd.

(57) ABSTRACT

A method for imaging includes focusing optical radiation so as to form respective first and second optical images of a scene on different, respective first and second regions of an array of detector elements. The focused optical radiation is filtered with different, respective first and second passbands for the first and second regions. A difference is taken between respective first and second input signals provided by the detector elements in the first and second regions so as to generate an output signal indicative of the difference.

25 Claims, 5 Drawing Sheets

(56) References Cited

U.S. PATENT DOCUMENTS

| | | | |
|---|---|---|---|
| 5,781,332 A | 7/1998 | Ogata | |
| 5,835,218 A | 11/1998 | Harding | |
| 5,838,428 A | 11/1998 | Pipitone et al. | |
| 5,856,871 A | 1/1999 | Cabib et al. | |
| 5,909,312 A | 6/1999 | Mendlovic et al. | |
| 6,002,520 A | 12/1999 | Hoch et al. | |
| 6,031,611 A | 2/2000 | Rosakis et al. | |
| 6,041,140 A | 3/2000 | Binns et al. | |
| 6,081,269 A | 6/2000 | Quarendon | |
| 6,084,712 A | 7/2000 | Harding | |
| 6,088,105 A | 7/2000 | Link | |
| 6,099,134 A | 8/2000 | Taniguchi et al. | |
| 6,100,517 A | 8/2000 | Yahav et al. | |
| 6,101,269 A | 8/2000 | Hunter et al. | |
| 6,108,036 A | 8/2000 | Harada et al. | |
| 6,167,151 A | 12/2000 | Albeck | |
| 6,259,561 B1 | 7/2001 | George et al. | |
| 6,262,740 B1 | 7/2001 | Lauer et al. | |
| 6,268,923 B1 | 7/2001 | Michniewicz et al. | |
| 6,301,059 B1 | 10/2001 | Huang et al. | |
| 6,325,514 B1 * | 12/2001 | Yamamoto | 353/31 |
| 6,377,700 B1 | 4/2002 | Mack et al. | |
| 6,438,263 B2 | 8/2002 | Albeck et al. | |
| 6,494,837 B2 | 12/2002 | Kim et al. | |
| 6,495,848 B1 | 12/2002 | Rubbert | |
| 6,560,019 B2 | 5/2003 | Nakai | |
| 6,583,873 B1 | 6/2003 | Goncharov et al. | |
| 6,611,000 B2 | 8/2003 | Tamura et al. | |
| 6,686,921 B1 | 2/2004 | Rushmeier et al. | |
| 6,700,669 B1 | 3/2004 | Geng | |
| 6,707,027 B2 | 3/2004 | Liess et al. | |
| 6,731,391 B1 | 5/2004 | Kao et al. | |
| 6,741,251 B2 | 5/2004 | Malzbender | |
| 6,750,906 B1 | 6/2004 | Itani et al. | |
| 6,751,344 B1 | 6/2004 | Grumbine | |
| 6,754,370 B1 | 6/2004 | Hall-Holt et al. | |
| 6,759,646 B1 | 7/2004 | Acharya et al. | |
| 6,803,777 B2 | 10/2004 | Pfaff et al. | |
| 6,810,135 B1 | 10/2004 | Berenz et al. | |
| 6,813,440 B1 | 11/2004 | Yu et al. | |
| 6,825,985 B2 | 11/2004 | Brown et al. | |
| 6,841,780 B2 | 1/2005 | Cofer et al. | |
| 6,859,326 B2 | 2/2005 | Sales | |
| 6,927,852 B2 | 8/2005 | Reel | |
| 6,937,348 B2 | 8/2005 | Geng | |
| 6,940,583 B2 | 9/2005 | Butt et al. | |
| 7,006,952 B1 | 2/2006 | Matsumoto et al. | |
| 7,009,742 B2 | 3/2006 | Brotherton-Ratcliffe et al. | |
| 7,013,040 B2 | 3/2006 | Shiratani | |
| 7,076,024 B2 | 7/2006 | Yokhin | |
| 7,112,774 B2 | 9/2006 | Baer | |
| 7,120,228 B2 | 10/2006 | Yokhin et al. | |
| 7,127,101 B2 | 10/2006 | Littlefield et al. | |
| 7,173,656 B1 * | 2/2007 | Dunton et al. | 348/243 |
| 7,194,105 B2 | 3/2007 | Hersch et al. | |
| 7,227,618 B1 | 6/2007 | Bi | |
| 7,231,069 B2 | 6/2007 | Nahata | |
| 7,256,899 B1 | 8/2007 | Faul et al. | |
| 7,304,735 B2 | 12/2007 | Wang et al. | |
| 7,335,898 B2 | 2/2008 | Donders et al. | |
| 7,369,685 B2 | 5/2008 | DeLean | |
| 7,385,708 B2 | 6/2008 | Ackerman et al. | |
| 7,433,024 B2 | 10/2008 | Garcia et al. | |
| 7,551,719 B2 | 6/2009 | Yokhin et al. | |
| 7,560,679 B1 | 7/2009 | Gutierrez | |
| 7,659,995 B2 | 2/2010 | Knighton et al. | |
| 7,700,904 B2 | 4/2010 | Toyoda et al. | |
| 7,751,063 B2 | 7/2010 | Dillon et al. | |
| 7,811,825 B2 | 10/2010 | Fauver et al. | |
| 7,840,031 B2 | 11/2010 | Albertson et al. | |
| 7,952,781 B2 | 5/2011 | Weiss et al. | |
| 8,018,579 B1 | 9/2011 | Krah | |
| 8,035,806 B2 | 10/2011 | Jin et al. | |
| 8,126,261 B2 | 2/2012 | Medioni et al. | |
| 8,326,025 B2 | 12/2012 | Boughorbel | |
| 2001/0016063 A1 | 8/2001 | Albeck et al. | |
| 2002/0041327 A1 | 4/2002 | Hildreth et al. | |
| 2002/0075456 A1 | 6/2002 | Shiratani | |
| 2002/0176605 A1 * | 11/2002 | Stafsudd et al. | 382/106 |
| 2003/0048237 A1 | 3/2003 | Sato et al. | |
| 2003/0057972 A1 | 3/2003 | Pfaff et al. | |
| 2003/0156756 A1 | 8/2003 | Gokturk et al. | |
| 2004/0001145 A1 | 1/2004 | Abbate | |
| 2004/0012958 A1 | 1/2004 | Hashimoto et al. | |
| 2004/0063235 A1 | 4/2004 | Chang | |
| 2004/0082112 A1 | 4/2004 | Stephens | |
| 2004/0105580 A1 | 6/2004 | Hager et al. | |
| 2004/0130730 A1 | 7/2004 | Cantin et al. | |
| 2004/0130790 A1 | 7/2004 | Sales | |
| 2004/0174770 A1 | 9/2004 | Rees | |
| 2004/0213463 A1 | 10/2004 | Morrison | |
| 2004/0218262 A1 | 11/2004 | Chuang et al. | |
| 2004/0228519 A1 | 11/2004 | Littlefield et al. | |
| 2004/0264764 A1 | 12/2004 | Kochi et al. | |
| 2005/0018209 A1 | 1/2005 | Lemelin et al. | |
| 2005/0052637 A1 | 3/2005 | Shaw et al. | |
| 2005/0111705 A1 | 5/2005 | Waupotitsch et al. | |
| 2005/0134582 A1 | 6/2005 | Claus et al. | |
| 2005/0135555 A1 | 6/2005 | Claus et al. | |
| 2005/0178950 A1 | 8/2005 | Yoshida | |
| 2005/0200838 A1 | 9/2005 | Shaw et al. | |
| 2005/0200925 A1 | 9/2005 | Brotherton-Ratcliffe et al. | |
| 2005/0231465 A1 | 10/2005 | DePue et al. | |
| 2005/0271279 A1 | 12/2005 | Fujimura et al. | |
| 2006/0001055 A1 | 1/2006 | Ueno et al. | |
| 2006/0017656 A1 | 1/2006 | Miyahara | |
| 2006/0072851 A1 | 4/2006 | Kang et al. | |
| 2006/0156756 A1 | 7/2006 | Becke | |
| 2006/0221218 A1 | 10/2006 | Adler et al. | |
| 2006/0221250 A1 | 10/2006 | Rossbach et al. | |
| 2006/0252167 A1 | 11/2006 | Wang | |
| 2006/0252169 A1 | 11/2006 | Ashida | |
| 2006/0269896 A1 | 11/2006 | Liu et al. | |
| 2007/0019909 A1 | 1/2007 | Yamauchi et al. | |
| 2007/0057946 A1 | 3/2007 | Albeck et al. | |
| 2007/0060336 A1 | 3/2007 | Marks et al. | |
| 2007/0109398 A1 * | 5/2007 | Teo | 348/36 |
| 2007/0133840 A1 | 6/2007 | Cilia | |
| 2007/0165243 A1 | 7/2007 | Kang et al. | |
| 2007/0262985 A1 | 11/2007 | Watanabe et al. | |
| 2008/0018595 A1 | 1/2008 | Hildreth et al. | |
| 2008/0031513 A1 | 2/2008 | Hart | |
| 2008/0037829 A1 | 2/2008 | Givon | |
| 2008/0106746 A1 | 5/2008 | Shpunt et al. | |
| 2008/0118143 A1 | 5/2008 | Gordon et al. | |
| 2008/0198355 A1 | 8/2008 | Domenicali et al. | |
| 2008/0212835 A1 | 9/2008 | Tavor | |
| 2008/0240502 A1 | 10/2008 | Freedman et al. | |
| 2008/0247670 A1 | 10/2008 | Tam et al. | |
| 2008/0278572 A1 | 11/2008 | Gharib et al. | |
| 2008/0285827 A1 | 11/2008 | Meyer et al. | |
| 2008/0309813 A1 | 12/2008 | Watanabe | |
| 2009/0016642 A1 | 1/2009 | Hart | |
| 2009/0046152 A1 | 2/2009 | Aman | |
| 2009/0060307 A1 | 3/2009 | Ghanem et al. | |
| 2009/0073324 A1 | 3/2009 | Tan et al. | |
| 2009/0090937 A1 | 4/2009 | Park | |
| 2009/0096783 A1 | 4/2009 | Shpunt et al. | |
| 2009/0102956 A1 | 4/2009 | Georgiev | |
| 2009/0128669 A1 | 5/2009 | Ng et al. | |
| 2009/0183125 A1 | 7/2009 | Magal et al. | |
| 2009/0183152 A1 | 7/2009 | Yang et al. | |
| 2009/0185274 A1 | 7/2009 | Shpunt | |
| 2009/0185801 A1 | 7/2009 | Georgiev et al. | |
| 2009/0190022 A1 | 7/2009 | Ichimura | |
| 2009/0226079 A1 | 9/2009 | Katz et al. | |
| 2009/0244309 A1 | 10/2009 | Maison et al. | |
| 2009/0295829 A1 | 12/2009 | Georgiev et al. | |
| 2009/0316014 A1 | 12/2009 | Lim et al. | |
| 2010/0007717 A1 | 1/2010 | Spektor et al. | |
| 2010/0013860 A1 | 1/2010 | Mandella et al. | |
| 2010/0020078 A1 | 1/2010 | Shpunt | |
| 2010/0118123 A1 | 5/2010 | Freedman et al. | |
| 2010/0128221 A1 | 5/2010 | Muller et al. | |

(56) References Cited

U.S. PATENT DOCUMENTS

| | | |
|---|---|---|
| 2010/0142014 A1 | 6/2010 | Rosen et al. |
| 2010/0177164 A1 | 7/2010 | Zalevsky et al. |
| 2010/0182406 A1 | 7/2010 | Benitez |
| 2010/0194745 A1 | 8/2010 | Leister et al. |
| 2010/0201811 A1 | 8/2010 | Garcia et al. |
| 2010/0208100 A9* | 8/2010 | Olsen et al. ............... 348/227.1 |
| 2010/0225746 A1 | 9/2010 | Shpunt et al. |
| 2010/0243899 A1 | 9/2010 | Ovsiannikov et al. |
| 2010/0245826 A1 | 9/2010 | Lee |
| 2010/0265316 A1 | 10/2010 | Sali et al. |
| 2010/0278384 A1 | 11/2010 | Shotton et al. |
| 2010/0284082 A1 | 11/2010 | Shpunt et al. |
| 2010/0290698 A1 | 11/2010 | Freedman et al. |
| 2010/0303289 A1 | 12/2010 | Polzin et al. |
| 2010/0304854 A1* | 12/2010 | McEldowney ............... 463/30 |
| 2011/0001799 A1 | 1/2011 | Rothenberger et al. |
| 2011/0019258 A1 | 1/2011 | Levola |
| 2011/0025827 A1 | 2/2011 | Shpunt et al. |
| 2011/0043403 A1 | 2/2011 | Loffler |
| 2011/0069389 A1 | 3/2011 | Shpunt |
| 2011/0074932 A1 | 3/2011 | Gharib et al. |
| 2011/0075259 A1 | 3/2011 | Shpunt |
| 2011/0080487 A1 | 4/2011 | Venkataraman et al. |
| 2011/0096182 A1 | 4/2011 | Cohen et al. |
| 2011/0114857 A1 | 5/2011 | Akerman et al. |
| 2011/0134114 A1 | 6/2011 | Rais et al. |
| 2011/0158508 A1 | 6/2011 | Shpunt et al. |
| 2011/0187878 A1 | 8/2011 | Mor et al. |
| 2011/0188054 A1 | 8/2011 | Petronius et al. |
| 2011/0211044 A1 | 9/2011 | Shpunt et al. |
| 2011/0279648 A1 | 11/2011 | Lutian et al. |
| 2011/0285910 A1 | 11/2011 | Bamji et al. |
| 2011/0295331 A1 | 12/2011 | Wells et al. |
| 2011/0310125 A1 | 12/2011 | McEldowney et al. |
| 2012/0012899 A1 | 1/2012 | Jin et al. |
| 2012/0038986 A1 | 2/2012 | Pesach |
| 2012/0051588 A1 | 3/2012 | McEldowney |
| 2012/0140094 A1 | 6/2012 | Shpunt et al. |
| 2012/0140109 A1 | 6/2012 | Shpunt et al. |
| 2012/0249744 A1 | 10/2012 | Pesach et al. |
| 2012/0281240 A1 | 11/2012 | Cohen et al. |
| 2013/0127854 A1 | 5/2013 | Shpunt et al. |
| 2013/0206967 A1 | 8/2013 | Shpunt et al. |
| 2013/0207970 A1 | 8/2013 | Shpunt et al. |

FOREIGN PATENT DOCUMENTS

| | | |
|---|---|---|
| DE | 19638727 A1 | 3/1998 |
| GB | 2352901 A | 2/2001 |
| JP | 62206684 A | 9/1987 |
| JP | 01-240863 | 9/1989 |
| JP | 03-029806 U | 2/1991 |
| JP | H03-040591 A | 2/1991 |
| JP | 06-273432 | 9/1994 |
| JP | H08-186845 A | 7/1996 |
| JP | H10-327433 A | 12/1998 |
| JP | 2000131040 A | 5/2000 |
| JP | 2001141430 A | 5/2001 |
| JP | 2002122417 A | 4/2002 |
| JP | 2002-152776 A | 5/2002 |
| JP | 2002-213931 A | 7/2002 |
| JP | 2002-365023 A | 12/2002 |
| JP | 2006-128818 A | 5/2006 |
| JP | 2011118178 A | 6/2011 |
| WO | 9303579 A1 | 2/1993 |
| WO | 9827514 A2 | 6/1998 |
| WO | 9828593 A1 | 7/1998 |
| WO | 9828593 A2 | 7/1998 |
| WO | 2005010825 A2 | 2/2005 |
| WO | 2007/043036 A1 | 4/2007 |
| WO | 2007/105205 A2 | 9/2007 |
| WO | 2008/120217 A2 | 10/2008 |
| WO | 2010/004542 A1 | 1/2010 |
| WO | 2012020380 A1 | 2/2012 |
| WO | 2012066501 A1 | 5/2012 |

OTHER PUBLICATIONS

International Application PCT/IL2008/01592 Search Report dated Apr. 3, 2009.

U.S. Appl. No. 61/521,406, filed Aug. 9, 2011.

Gerchberg et al., "A Practical Algorithm for the Determination of the Phase from Image and Diffraction Plane Pictures," Journal Optik, vol. 35, No. 2, pp. 237-246, year 1972.

Sazbon et al., "Qualitative Real-Time Range Extraction for Preplanned Scene Partitioning Using Laser Beam Coding," Pattern Recognition Letters 26, pp. 1772-1781, year 2005.

Moharam et al. "Rigorous coupled-wave analysis of planar-grating diffraction", Journal of the Optical Society of America, vol. 71, No. 6, pp. 818-818, Jul. 1981.

U.S. Appl. No. 61/521,395, filed Aug. 9, 2011.

Eisen et al., "Total internal reflection diffraction grating in conical mounting",Optical Communications 261, pp. 13-18, year 2006.

O'Shea et al., "Diffractive Optics: Design, Fabrication and Test", SPIE Tutorial Texts in Optical Engineering, vol. TT62, pp. 66-72, SPIE Press, USA 2004.

International Application PCT/IB2011/055155 filed Nov 17, 2011.

U.S. Appl. No. 61/568,185, filed Dec. 8, 2011.

U.S. Appl. No. 12/330,766 Official Action dated Dec. 14, 2010.

EZconn Czech A.S. "Site Presentation", Oct. 2009.

Luxtera Inc., "Luxtera Announces World's First 10GBit CMOS Photonics Platform", Carlsbad, USA, Mar. 28, 2005 (press release).

Bradley et al., "Synchronization and Rolling Shutter Compensation for Consumer Video Camera Arrays", IEEE International Workshop on Projector-Camera Systems—PROCAMS 2009, Miami Beach, Florida, 2009.

Marcia et al., "Fast Disambiguation of Superimposed Images for Increased Field of View", IEEE International Conference on Image Processing, San Diego, USA, Oct. 12-15, 2008.

U.S. Appl. No. 61/614,029, filed Mar 22, 2012.

Btendo, "Two Uni-axial Scanning Mirrors Vs One Bi-axial Scanning Mirror", Kfar Saba, Israel, Aug. 13, 2008.

Microvision Inc., "Micro-Electro-Mechanical System (MEMS) Scanning Mirror", years 1996-2009.

European Patent Application # 11150668.9 Partial European Search Report dated Apr. 1, 2011.

U.S. Appl. No. 12/330,766 Official Action dated Jun. 7, 2011.

Garcia et al., "Three-dimensional mapping and range measurement by means of projected speckle patterns", Applied Optics, vol. 47, No. 16, pp. 3032-3040, Jun. 1, 2008.

Garcia et al.., "Projection of Speckle Patterns for 3D Sensing", Journal of Physics, Conference series 139, year 2008.

CN Patent Application # 200880119911.9 Office Action dated Jan. 29, 2012.

U.S. Appl. No. 12/955,939 Office Action dated Jan. 30, 2012.

U.S. Appl. No. 12/955,940 Office Action dated Jan. 11, 2012.

U.S. Appl. No. 12/762,373 Office Action dated Mar. 7, 2012.

International Application PCT/IB2011/053560 Search Report dated Jan. 19, 2012.

U.S. Appl. No. 61/611,075, filed Mar. 15, 2012.

U.S. Appl. No. 12/945,908 Official Action dated Dec. 5, 2012.

U.S. Appl. No. 13/008,042 Official Action dated Jan. 3, 2013.

U.S. Appl. No. 13/567,095 Office Action dated Oct. 1, 2013.

U.S. Appl. No. 13/008,042 Office Action dated Dec. 3, 2013.

U.S. Appl. No. 12/330,766 Office Action dated Jul. 16, 2013.

International Application PCT/IB2013/051986 Search Report dated Jul. 30, 2013.

U.S. Appl. No. 13/008,042 Office Action dated Jul. 15, 2013.

Hart, D., U.S. Appl. No. 09/616,606 "Method and System for High Resolution, Ultra Fast 3-D Imaging" filed Jul. 14, 2000.

International Application PCT/IL2007/000306 Search Report dated Oct. 2, 2008.

International Application PCT/IL20027/000262 Search Report dated Oct. 16, 2008.

(56) References Cited

OTHER PUBLICATIONS

International Application PCT/IL2008/000458 Search Report dated Oct. 28, 2008.
International Application PCT/IL2008/000327 Search Report dated Sep. 26, 2008.
International Application PCT/IL2006/000335 Preliminary Report on Patentability dated Apr. 24, 2008.
Sazbon et al., "Qualitative real-time range extraction for preplanned scene partitioning using laser beam coding", Pattern Recognition Letters 26, pp. 1772-1781, year 2005.
Sjodahl et al., "Measurement of shape by using projected random and patterns and temporal digital speckle photography", Applied Optics, vol. 38, No. 10, Apr. 1, 1999.
Garcia et al., "Three dimensional mapping and range measurement by means of projected speckle patterns", Applied Optics, vol. 47, No. 16, Jun. 1, 2008.
Chen et al., "Measuring of a Three-Dimensional Surface by Use of a Spatial Distance Computation", Applied Optics, vol. 42, issue 11, pp. 1958-1972, Apr. 10, 2003.
Ypsilos et al., "Speech-driven Face Synthesis from 3D Video", 2nd International Symposium on 3D Processing, Visualization and Transmission, Thessaloniki, Greece, Sep. 6-9, 2004.
Hanson et al., "Optics and Fluid Dynamics Department", Annual Progress Report for 1997 (an abstract).
Ypsilos et al., "Video-rate capture of Dynamic Face Shape and Appearance", Sixth IEEE International Conference on Automatic Face and Gesture Recognition (FGR 2004), Seoul, Korea, May 17-19, 2004.
Goodman, J.W., "Statistical Properties of Laser Speckle Patterns", Laser Speckle and Related Phenomena, pp. 9-75, Springer-Verlag, Berlin Heidelberg, 1975.
Dainty, J.C., "Introduction", Laser Speckle and Related Phenomena, pp. 1-7, Springer-Verlag, Berlin Heidelberg, 1975.
Avidan et al., "Trajectory triangulation: 3D reconstruction of moving points from amonocular image sequence", IEEE Transactions on Pattern Analysis and Machine Intelligence, vol. 22, No. 4, pages, Apr. 2000.
Leclerc et al., "The direct computation of height from shading", Proceedings of Computer Vision and Pattern Recognition, pp. 552-558, year 1991.
Zhang et al., "Height recovery from intensity gradients", Proceedings of IEEE Computer Society Conference on Computer Vision and Pattern Recognition, pp. 508-513, year 1994.
Zigelman et al., "Texture mapping using surface flattening via multi-dimensional scaling", IEEE Transactions on Visualization and Computer Graphics, 8 (2), pp. 198-207, year 2002.
Kimmel et al., Analyzing and synthesizing images by evolving curves with the Osher-Sethian method, International Journal of Computer Vision, 24(1), pp. 37-56, year 1997.
Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.
Horn, B., "Height and gradient from shading", International Journal of Computer Vision, No. 5, pp. 37-76, year 1990.
Bruckstein, A., "On shape from shading", Computer Vision, Graphics, and Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.
Besl, P., "Active Optical Range Imaging Sensors", Machine Vision and Applications, No. 1, pp. 127-152, USA 1988.
Horn et al., "Toward optimal structured light patterns", Proceedings of International Conference on Recent Advances in 3D Digital Imaging and Modeling, pp. 28-37, Ottawa, Canada, May 1997.
Mendlovic, et al., "Composite harmonic filters for scale, projection and shift invariant pattern recognition", Applied Optics, vol. 34, No. 2, pp. 310-316, Jan. 10, 1995.
Asada et al., "Determining Surface Orientation by Projecting a Stripe Pattern", IEEE Transactions on Pattern Analysis and Machine Intelligence, vol. 10, No. 5, year 1988.
Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.
EZconn Czech A.S., "Site Presentation", Oct. 2009.
Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.
Lee et al., "Variable Pulse Mode Driving IR Source Based 3D Robotic Camera", MVA2005 IAPR Conference on Machine Vision Applications, pp. 530-533, Japan, May 16-18, 2005.
Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.
Beraldin et al., "Active 3D Sensing", Scuola Normale Superiore Pisa, vol. 10, pp. 22-46, Apr. 2000.
Bhat et al., "Ordinal Measures for Image Correspondence", IEEE Transactions on Pattern Analysis and Machine Intelligence, vol. 20, No. 4, pp. 415-423, Apr. 1998.
Bradley et al., "Synchronization and Rolling Shutter Compensation for Consumer Video Camera Arrays", IEEE International Workshop on Projector-Camera Systems—PROCAMS 2009 (Miami Beach, Florida, 2009).
De Piero et al., "3D Computer Vision Using Structured Light: Design Calibration and Implementation Issues", Advances in Computers, vol. 43, pp. 243-278, Academic Press 1996.
Hongjun et al., "Shape Measurement by Digital Speckle Temporal Sequence Correlation Method", Acta Optica Sinica Journal, vol. 21, No. 10, pp. 1208-1213, Oct. 2001 (with English abstract).
Hongjun, D., "Digital Speckle Temporal Sequence Correlation Method and the Application in Three-Dimensional Shape Measurement", Chinese Doctoral Dissertations & Master's Theses, Full-text Database (Master) Basic Sciences, No. 1, Mar. 15, 2004.
Hsueh et al., "Real-time 3D Topography by Speckle Image Correlation", Proceedings of SPIE Conference on Input/Output and Imaging Technologies, vol. 3422, pp. 108-112, Taiwan, Jul. 1998.
Chinese Patent Application # 200780009053.8 Official Action dated Apr. 15, 2010 (English translation).
Chinese Patent Application # 200680038004.2 Official Action dated Mar. 30, 2010 (English translation).
Chinese Patent Application # 200680038004.2 Official Action dated Aug. 3, 2011 (English translation).
Engfield, N., "Use of Pseudorandom Encoded Grid in U.S. Appl. No. 11/899,542", Andrews Robichaud, Jun. 22, 2011.
U.S. Appl. No. 12/522,171 Official Action dated Apr. 5, 2012.
U.S. Appl. No. 12/397,362 Official Action dated Apr. 24, 2012.
International Application PCT/IB2011/055155 Search Report dated Apr. 20, 2012.
U.S. Appl. No. 12/703,794 Official Action dated Aug. 7, 2012.
U.S. Appl. No. 12/522,176 Official Action dated Aug. 2, 2012.
U.S. Appl. No. 12/522,172 Official Action dated Jun. 29, 2012.
Richardson, W. H., "Bayesian-Based Iterative Method of Image Restoration", Journal of the Optical Society of America, vol. 62, No. 1, pp. 55-59, Jan. 1972.
Omnivision Technologies Inc., "OV2710 1080p/720p HD Color CMOS Image Sensor with OmniPixel3-HS Technology", Dec. 2011.
JP Patent Application # 2008558984 Office Action dated Jul. 3, 2012.
U.S. Appl. No. 12/282,517 Official Action dated Jun. 12, 2012.
Japanese Patent Application # 2011-517308 Office Action dated Jun. 19, 2012.
U.S. Appl. No. 13/036,023 Office Action dated Jul. 17, 2013.
U.S. Appl. No. 12/707,678 Office Action dated Jun. 20, 2013.
International Application PCT/IB2013/051189 Search Report dated Jun. 18, 2013.
U.S. Appl. No. 13/036,023 Office Action dated Sep. 3, 2013.
U.S. Appl. No. 12/844,864 Office Action dated Sep. 26, 2013.
U.S. Appl. No. 13/921,224 Office Action dated Oct. 3, 2013.
U.S. Appl. No. 12/958,427 Office Action dated Nov. 22, 2013.

(56) References Cited

OTHER PUBLICATIONS

Japanese Patent Application # 2008558981 Official Action dated Nov. 2, 2011.
U.S. Appl. No. 12/522,171 Official Action dated Dec. 22, 2011.
U.S. Appl. No. 12/522,172 Official Action dated Nov. 30, 2011.
Japanese Patent Application # 2008558984 Official Action dated Nov. 1, 2011.
U.S. Appl. No. 13/043,488 Official Action dated Jan. 3, 2012.
Japanese Patent Application # 2008535179 Official Action dated Nov. 8, 2011.
Chinese Patent Application # 2006800038004.2 Official Action dated Nov. 24, 2011.
Marcia et al., "Superimposed Video Disambiguation for Increased Field of View", Optics Express 16:21, pp. 16352-16363, year 2008.
Guan et al., "Composite Structured Light Pattern for Three Dimensional Video", Optics Express 11:5, pp. 406-417, year 2008.
U.S. Appl. No. 12/955,939 Office Action dated Jun. 1, 2012.
U.S. Appl. No. 12/955,940 Office Action dated Jun. 27, 2012.
U.S. Appl. No. 12/840,312 Office Action dated Jul. 12, 2012.
Japanese Patent Application # 2011-517308 Official Action dated Dec. 5, 2012.
U.S. Appl. No. 12/844,864 Official Action dated Dec. 6, 2012.
U.S. Appl. No. 12/758,047 Official Action dated Oct. 25, 2012.
U.S. Appl. No. 13/036,023 Official Action dated Jan. 7, 2013.
Abramson, N., "Holographic Contouring by Translation", Applied Optics Journal, vol. 15, No. 4, pp. 1018-1976, Apr. 1976.
Achan et al., "Phase Unwrapping by Minimizing Kikuchi Free Energy", IEEE International Geoscience and Remote Sensing Symposium, pp. 1738-1740, Toronto, Canada, Jun. 2002.
Theocaris et al., "Radial Gratings as Moire Gauges", Journal of Scientific Instruments (Journal of Physics E), series 2, vol. 1, year 1968.
Chinese Patent Application # 200780016625.5 Official Action dated Oct. 26, 2010.
International Application PCT/IL2009/000285 Search Report dated Jun. 11, 2009.
Brooks et al., "Moire Gauging Using Optical Interference Patterns", Applied Optics Journal, vol. 8, No. 5, pp. 935-940, May 1969.
Hovanesian et al., "Moire Contour-Sum Contour-Difference, and Vibration Analysis of Arbitrary Objects", Applied Optics Journal, vol. 10, No. 12, pp. 2734-2738, Dec. 1971.
Bryngdahl, O., "Characteristics of Superposed Patterns in Optics", Journal of Optical Society of America, vol. 66, No. 2, pp. 87-94, Feb. 1976.
International Application PCT/IL2008/000095 Search Report dated Jul. 24, 2008.
Chen et al., "Overview of Three-Dimensional Shape Measurement Using Optical Methods", Society of Photo-Optical Instrumentation Engineers Journal 39(1), pp. 10-22, Jan. 2000.
Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.
Zhang et al., "Shape from intensity gradient", IEEE Transactions on Systems, Man and Cybernetics—Part A: Systems and Humans, vol. 29, No. 3, pp. 318-325, May 1999.
Doty, J.L., "Projection Moire for Remote Contour Analysis", Journal of Optical Society of America, vol. 73, No. 3, pp. 366-372, Mar. 1983.
Ben Eliezer et al., "Experimental Realization of an Imaging System with an Extended Depth of Field", Applied Optics Journal, vol. 44, No. 14, pp. 2792-2798, May 10, 2005.
Tay et al., "Grating Projection System for Surface Contour Measurement", Applied Optics Journal, vol. 44, No. 8, pp. 1393-1400, Mar. 10, 2005.
Takeda et al., "Fourier Transform Methods of Fringe-Pattern Analysis for Computer-Based Topography and Interferometry", Journal of Optical Society of America, vol. 72, No. 1, Jan. 1982.
Takasaki, H., "Moire Topography", Applied Optics Journal, vol. 12, No. 4, pp. 845-850, Apr. 1973.
Takasaki, H., "Moire Topography", Applied Optics Journal, vol. 9, No. 6, pp. 1467-1472, Jun. 1970.
Hildebrand et al., "Multiple-Wavelength and Multiple-Source Holography Applied to Contour Generation", Journal of Optical Society of America Journal, vol. 57, No. 2, pp. 155-162, Feb. 1967.
Su et al., "Application of Modulation Measurement Profilometry to Objects with Surface Holes", Applied Optics Journal, vol. 38, No. 7, pp. 1153-1158, Mar. 1, 1999.
Hung et al., "Time-Averaged Shadow-Moire Method for Studying Vibrations", Applied Optics Journal, vol. 16, No. 6, pp. 1717-1719, Jun. 1977.
Idesawa et al., "Scanning Moire Method and Automatic Measurement of 3-D Shapes", Applied Optics Journal, vol. 16, No. 8, pp. 2152-2162, Aug. 1977.
Iizuka, K., "Divergence-Ratio Axi-Vision Camera (Divcam): A Distance Mapping Camera", Review of Scientific Instruments 77, 0451111 (2006).
Lim et al., "Additive Type Moire with Computer Image Processing", Applied Optics Journal, vol. 28, No. 13, pp. 2677-2680, Jul. 1, 1989.
Piestun et al., "Wave Fields in Three Dimensions: Analysis and Synthesis", Journal of the Optical Society of America, vol. 13, No. 9, pp. 1837-1848, Sep. 1996.
Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.
Chinese Patent Application # 200780006560.6 Official Action dated Oct. 11, 2010.
International Application PCT/IB2010/053430 Search Report dated Dec. 28, 2010.
Scharstein et al., "High-Accuracy Stereo Depth Maps Using Structured Light", IEEE Proceedings of the Conference on Computer Vision and Pattern Recognition, pp. 165-171, Jun. 18, 2003.
Koschan et al., "Dense Depth Maps by Active Color Illumination and Image Pyramids", Advances in Computer Vision, pp. 137-148, Springer 1997.
Chinese Patent Application # 200780006560.6 Official Action dated Feb. 1, 2011.
Yao Kun et al., "Measurement of Space Distribution of Laser Gaussian Beam by Speckles Displacement Method", High Power Laser and Particle Beams, vol. 12, No. 2, pp. 141-144, Apr. 30, 2000.
Lavoie et al., "3-D Object Model Recovery From 2-D Images Using Structured Light", IEEE Transactions on Instrumentation and Measurement, vol. 53, No. 2, pp. 437-443, Apr. 2004.
Chinese Application # 200780016625.5 Office Action dated May 12, 2011.
U.S. Appl. No. 11/899,542 Office Action dated Apr. 4, 2011.
U.S. Appl. No. 11/724,068 Office Action dated Mar. 1, 2011.
Chinese Application # 200780009053.8 Office Action dated Mar. 10, 2011.
Japanese Application # 2008535179 Office Action dated Apr. 1, 2011.
Kun et al., "Gaussian Laser Beam Spatial Distribution Measurement by Speckles Displacement Method", HICH Power Laser and Particle Beams, vol. 12, No. 2, Apr. 2000.
Chinese Patent Application # 200680038004.2 Official Action dated Dec. 24, 2010.
Korean Patent Application # 10-2008-7025030 Office Action dated Feb. 25, 2013.
U.S. Appl. No. 12/707,678 Office Action dated Feb. 26, 2013.
U.S. Appl. No. 12/758,047 Office Action dated Apr. 25, 2013.
U.S. Appl. No. 12/844,864 Office Action dated Apr. 11, 2013.
U.S. Appl. No. 13/311,589 Office Action dated Dec. 15, 2014.
U.S Appl. No. 13/311,589 Office Action dated Apr. 28, 2015.

* cited by examiner

LENS ARRAYS FOR PATTERN PROJECTION AND IMAGING

CROSS-REFERENCE TO RELATED APPLICATION

This application claims the benefit of U.S. Provisional Patent Application 61/419,891, filed Dec. 12, 2010. It is related to another U.S. patent application, filed on even date, entitled "Projection and Imaging Using Lens Arrays." Both of these related applications are incorporated herein by reference.

FIELD OF THE INVENTION

The present invention relates generally to optical projection and imaging, and specifically to devices and methods that use arrays of lenses to enhance the performance and characteristics of projection and imaging systems.

BACKGROUND

In most optical imaging and projection systems, the optical elements are arranged in series along a single optical axis. Some systems, however, use arrays of lenses arranged side by side. The best-known arrangement of this sort is the "fly's eye" lens array, which is generally used to achieve uniform irradiance in projection optics.

Lens arrays are also used in some imaging devices. For example, U.S. Pat. No. 7,700,904, whose disclosure is incorporated herein by reference, describes a compound-eye imaging device, which comprises nine optical lenses arranged in a matrix array of three rows and three columns, and a solid-state imaging element for capturing unit images formed by the optical lenses. A stray light blocking member having a rectangular-shaped window is provided on the capture zone side of the optical lenses to block incident lights in a range outside each effective incident view angle range of each optical lens.

In general, the optics used in an imaging device are designed to form a single image on an image sensor. In some applications, however, multiple images may be superimposed. Such a scheme is described, for example, by Marcia et al., in "Superimposed Video Disambiguation for Increased Field of View," *Optics Express* 16:21, pages 16352-16363 (2008), which is incorporated herein by reference. The authors propose a method for increasing field of view (FOV) without increasing the pixel resolution of the focal plane array (FPA) by superimposing multiple sub-images within a static scene and disambiguating the observed data to reconstruct the original scene. According to the authors, this technique, in effect, allows each sub-image of the scene to share a single FPA, thereby increasing the FOV without compromising resolution.

Various methods are known in the art for optical 3D mapping, i.e., generating a 3D profile of the surface of an object by processing an optical image of the object. This sort of 3D map or profile is also referred to as a depth map or depth image, and 3D mapping is also referred to as depth mapping.

Some methods of 3D mapping are based on projecting a laser speckle pattern onto the object, and then analyzing an image of the pattern on the object. For example, PCT International Publication WO 2007/043036, whose disclosure is incorporated herein by reference, describes a system and method for object reconstruction in which a coherent light source and a generator of a random speckle pattern project onto the object a coherent random speckle pattern. An imaging unit detects the light response of the illuminated region and generates image data. Shifts of the pattern in the image of the object relative to a reference image of the pattern are used in real-time reconstruction of a 3D map of the object. Further methods for 3D mapping using speckle patterns are described, for example, in PCT International Publication WO 2007/105205, whose disclosure is also incorporated herein by reference.

Other methods of optical 3D mapping project different sorts of patterns onto the object to be mapped. For example, PCT International Publication WO 2008/120217, whose disclosure is incorporated herein by reference, describes an illumination assembly for 3D mapping that includes a single transparency containing a fixed pattern of spots. A light source transilluminates the transparency with optical radiation so as to project the pattern onto an object. An image capture assembly captures an image of the pattern on the object, and the image is processed so as to reconstruct a 3D map of the object.

SUMMARY

Embodiments of the present invention that are described hereinbelow provide improved methods and apparatus for light projection and imaging using lens arrays.

There is therefore provided, in accordance with an embodiment of the present invention, imaging apparatus, which includes an image sensor, including an array of detector elements, and objective optics, which are configured to focus optical radiation and are positioned so as to form respective first and second optical images of a scene on different, respective first and second regions of the array. First and second optical filters, having different respective first and second passbands, are positioned so as to filter the optical radiation focused by the first and second lenses onto the first and second regions, respectively. A subtracter is coupled to take a difference between respective first and second input signals provided by the detector elements in the first and second regions and to generate an output signal indicative of the difference.

Typically, the objective optics are arranged so that the first and second optical images contain a common field of view. In a disclosed embodiment, the objective optics include first and second lenses, which are configured to form the first and second optical images, respectively.

In one embodiment, the subtracter is configured to take the difference by subtracting digital pixel values from the first and second regions. Alternatively or additionally, the image sensor includes an integrated circuit chip, and the subtracter includes an analog component on the chip.

In some embodiments, the apparatus includes a projection module, which is configured to project a pattern onto the scene at a wavelength in the first passband, while the optical radiation focused by the objective optics includes ambient background radiation in both the first and second passbands, whereby the second input signal provides an indication of a level of the ambient background radiation for subtraction from the first input signal. The apparatus may include a processor, which is configured to process the output signal so as to generate a depth map of the scene responsively to the pattern appearing in the first optical image.

There is also provided, in accordance with an embodiment of the present invention, imaging apparatus, which includes an image sensor, including an array of detector elements, and a plurality of lenses, which are configured to form respective optical images of respective portions of a scene on different, respective regions of the array along respective optical axes. Diverting elements are fixed to respective surfaces of at least two of the lenses and are configured to deflect the respective optical axes of the at least two of the lenses angularly outward relative to a center of the image sensor.

In a disclosed embodiment, the diverting elements include diffractive patterns that are fabricated on the respective surfaces of the at least two of the lenses, wherein the diffractive patterns may define Fresnel prisms.

In some embodiments, the lenses have respective individual fields of view, and the apparatus includes a processor, which is configured to process an output of the image sensor so as to generate an electronic image having a combined field of view encompassing the different, respective portions of the scene whose optical images are formed by the lenses. The apparatus may include a projection module, which is configured to project a pattern onto the scene, wherein the processor is configured to process the electronic image so as to generate a depth map of the scene responsively to the pattern appearing in the optical images of the respective portions of the scene.

There is moreover provided, in accordance with an embodiment of the present invention, a method for imaging, which includes focusing optical radiation so as to form respective first and second optical images of a scene on different, respective first and second regions of an array of detector elements. The focused optical radiation is filtered with different, respective first and second passbands for the first and second regions. A difference is taken between respective first and second input signals provided by the detector elements in the first and second regions so as to generate an output signal indicative of the difference.

There is furthermore provided, in accordance with an embodiment of the present invention, a method for imaging, which includes positioning a plurality of lenses to form respective optical images of respective portions of a scene on different, respective regions of an array of detector elements along respective optical axes of the lenses. Diverting elements are fixed to respective surfaces of at least two of the lenses so as to deflect the respective optical axes of the at least two of the lenses angularly outward relative to a center of the array.

The present invention will be more fully understood from the following detailed description of the embodiments thereof, taken together with the drawings in which:

DETAILED DESCRIPTION OF EMBODIMENTS

Overview

Embodiments of the present invention that are described hereinbelow use lens arrays in novel ways to enhance the performance of optical imaging systems and of pattern projectors. In the disclosed embodiments, the lenses in an array are typically used together to form respective images on the same image sensor, or to project different parts of a pattern.

The embodiments of the present invention that are described hereinbelow are useful particularly in pattern-based depth mapping. Therefore, for clarity and convenience of presentation, these embodiments are shown and described in the context of the components of a depth mapping system. The principles of these embodiments, however, may also be used in other electronic imaging and optical projection applications, all of which are considered to be within the scope of the present invention.

Figure 1:
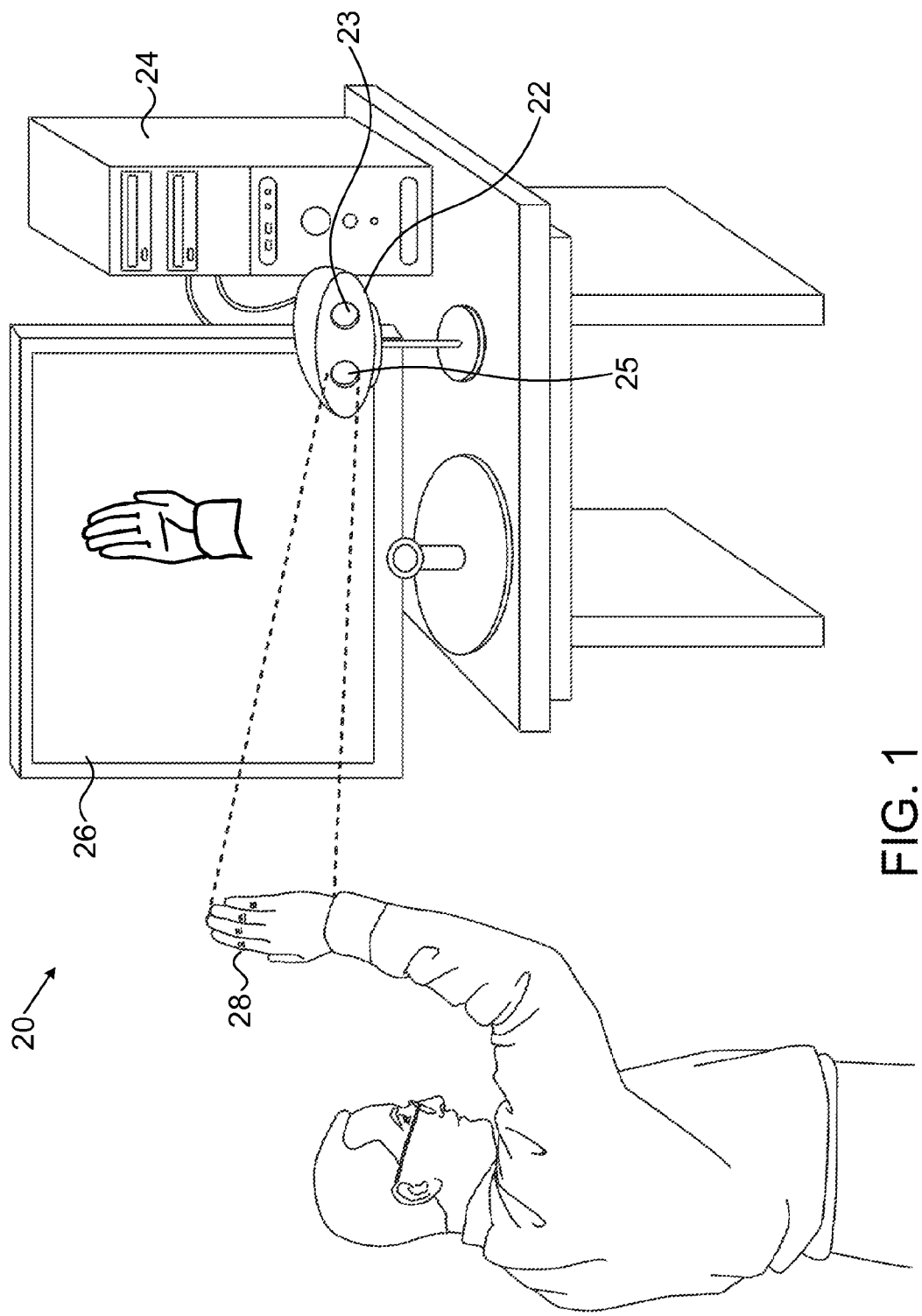
FIG. 1 is a schematic, pictorial illustration of a system for three-dimensional (3D) mapping, in accordance with an embodiment of the present invention.

FIG. 1 is a schematic, pictorial illustration of a system 20 for 3D mapping, in accordance with an embodiment of the present invention. In this example, an imaging device 22 is configured to capture images and generate 3D maps of a scene. The scene here includes a user 28 of the system (who is thus, in this case, the "object" of the imaging device, as well as its operator). The depth information in the 3D maps may be used by a host computer 24 as part of a 3D user interface, which enables the user to interact with games and other applications running on the computer and with elements shown on a display screen 26. (This sort of functionality is described, for example, in U.S. Patent Application Publication 2009/0183125, whose disclosure is incorporated herein by reference.) This particular application of system 20 is shown here only by way of example, however, and the mapping capabilities of system 20 may be used for other purposes, as well, and applied to substantially any suitable type of scenes and 3D objects.

In the example shown in FIG. 1, imaging device 22 comprises a projection module 23, which projects a pattern of optical radiation onto the scene, and an imaging module 25, which captures an image of the pattern that consequently appears on the body of user 28 and other objects in the scene (not shown in the figure). The optical radiation that is used for this purpose is typically, although not necessarily, in the infrared (IR) range, although visible or ultraviolet (UV) light may similarly be used. The terms "optical radiation," "illumination," and "light" are used synonymously in the present patent application and should be understood to include any or all of the IR, visible, and UV ranges. Module 23 may be designed to emit radiation in a narrow optical band, and a corresponding bandpass filter may be used in imaging module 25 in order to reduce the amount of ambient light detected by the imaging module.

A processor, such as computer 24 or an embedded processor (not shown) in device 22, processes the image of the pattern in order to generate a depth map of the body, i.e., an array of 3D coordinates, comprising a depth (Z) coordinate value of the body surface at each point (X,Y) within a predefined field of view. (In the context of an array of image-related data, these (X,Y) points are also referred to as pixels.) In the present embodiment, the processor computes the 3D coordinates of points on the surface of the user's body by triangulation, based on transverse shifts of the spots in the pattern, as described in the above-mentioned PCT publications WO 2007/043036, WO 2007/105205 and WO 2008/120217. This technique is referred to herein as "pattern-based depth mapping." The functionality of a processor similar to that in system 20 is further described, for example, in U.S. Patent Application Publication 2010/0007717, whose disclosure is incorporated herein by reference.

For many practical applications, it is advantageous that imaging module 25 have a wide field of view (FOV)—on the order of 90-120° or more in the horizontal direction and 60-90° or more in the vertical direction. The imaging module is also expected to provide a clear image of the pattern over a wide range of ambient light conditions, including scenes with a bright ambient background, which tends to reduce the contrast of the pattern in the captured images. On the other hand, power and safety considerations limit the output intensity of projection module 23. The embodiments that are described hereinbelow address these issues.

Imaging Module with on-Board Ambient Cancellation

Figure 2A:
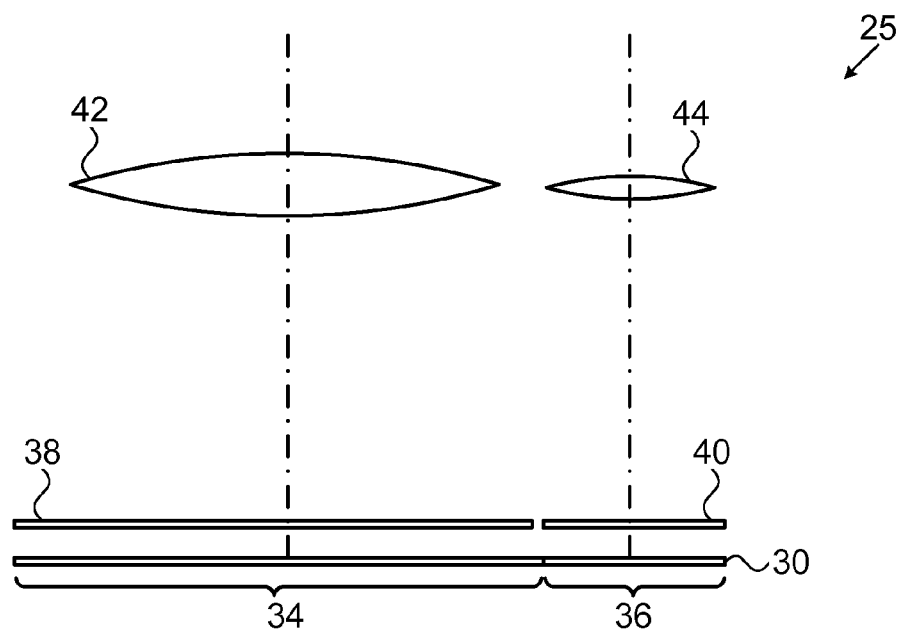
FIG. 2A is a schematic side view of an imaging module, in accordance with an embodiment of the present invention.
Figure 2B:
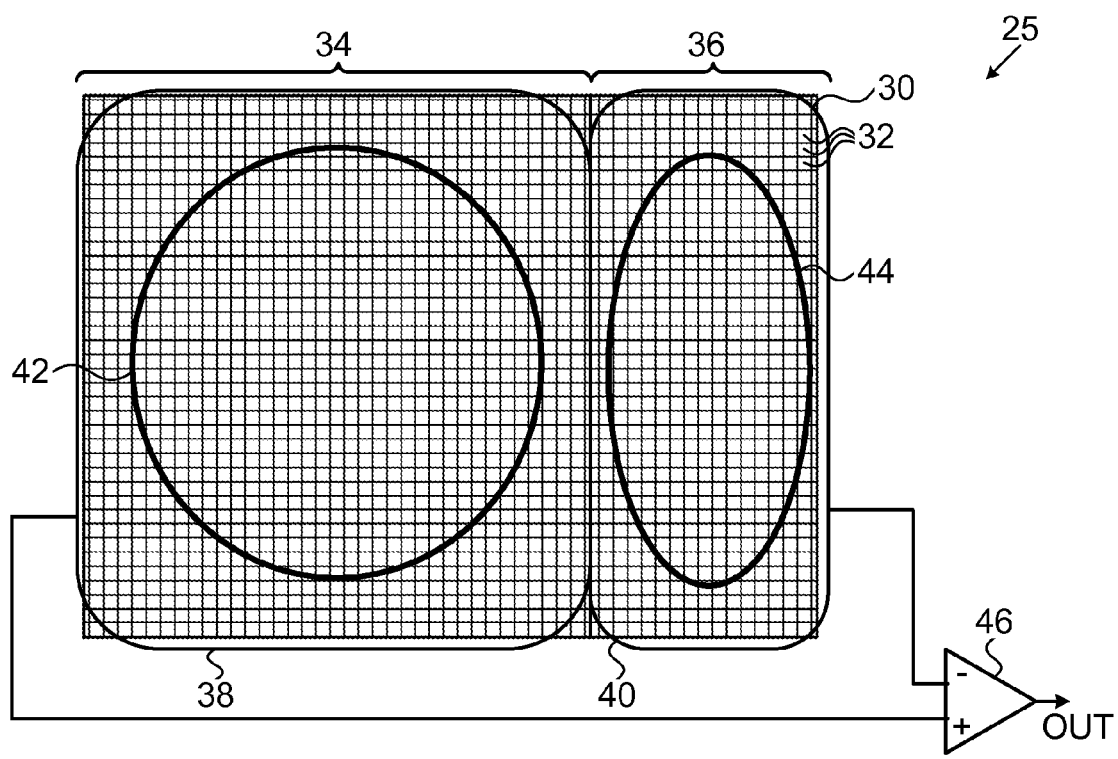
FIG. 2B is a schematic frontal view of the imaging module of FIG. 2A.

FIGS. 2A and 2B schematically illustrate an ambient light cancellation arrangement in imaging module 25, in accordance with an embodiment of the present invention. FIG. 2A is a side view showing an image sensor 30 and other elements of module 25, while FIG. 2B is a frontal view.

Image sensor 30 may be, for example, a CMOS device or CCD, comprising an array of detector elements 32. (For convenience of illustration, only a small number of detector elements is shown in the figure, while in actuality the array typically contains a much larger number of elements, generally well in excess of one million.) The detector elements are typically uniform in size and functionality over the matrix, but in this embodiment they are divided into two regions 34 and 36. The regions may be of the same size and shape, but for enhanced resolution of the specific image captured by region 34, it may be advantageous that region 34 is wider and thus includes a larger number of columns of detector elements 32, for example, twice as many columns as region 36. Both regions, however, have the same number of rows.

Objective optics, comprising lenses 42 and 44 form images of the scene of interest on regions 34 and 36, respectively, of sensor 30. Typically, the lenses are designed and oriented so that regions 34 and 36 capture images containing a common field of view. The image formed by lens 44 may therefore be distorted in the horizontal direction in order to fit into the narrower shape of region 36. Although, for the sake of simplicity, only a single lens is shown for each region, in practice arrays of multiple lenses may be used. Alternatively, a single lens (or group of lenses) with a suitable beamsplitting arrangement following the lens may be used to form the images on both of regions 34 and 36. Although lenses 42 and 44 are pictured as simple lenses, in practice compound lenses may be used in this and all the other embodiments of imaging module 25.

Lens 42 forms its image through a bandpass filter 38, which passes light of the wavelength (typically IR) that is emitted by projection module 23. Thus, region 34 senses an image of the pattern that has been projected by module 23 onto the scene of interest, along with whatever ambient light is reflected from the scene in the passband of the filter. On the other hand, lens 44 forms its image through a bandpass filter 40, whose passband does not include the wavelength of projection module 23. Thus, region 36 senses only ambient background radiation from the scene. The passband of filter 40 may be selected to be near that of filter 38 and of similar bandwidth, so that the image received by region 36 will provide a faithful measure of the ambient light component in the image received by region 34.

The ambient input signal from the rows of detector elements 32 in region 36 is thus indicative of the level of the ambient component in the input image signal from the corresponding rows in region 34. A subtracter takes a difference between this ambient component from region 36 and the input image signal generated by region 34 in order to generate an output signal representing to an electronic image of the pattern on the scene with improved signal/background ratio and hence improved contrast. Because the pixels in regions 34 and 36 are row-aligned, the image signals from the two regions are inherently synchronized. When a rolling shutter is used in image sensor 30 (as is common in CMOS-type sensors), the simultaneous capture and readout of the pixels in the two regions enables imaging module 25 to operate on non-static scenes without motion artifact.

One way to subtract the ambient component is to digitize the respective raw images from regions 34 and 36 and then subtract the digital pixel values using a suitable digital processor, such as computer 24 or hardware logic (not shown) in device 22. If region 36 is narrower than region 34, as shown in the figures, the pixel values in region 36 may be interpolated before subtraction.

Since the points of view of lenses 42 and 44 are slightly different, the images formed on regions 34 and also have slightly different perspectives (although typically, the disparity is less than ¾ of the sensor width). It is beneficial to register the pixels of the image in region 36 with those in region 34 prior to subtracting. Such registration can be achieved, for example, using optical flow techniques that are known in art. Prior to performing the subtraction, the image in region 36 is interpolated onto the image in region 34 so as to represent the same pixels, same point of view and same overall optical gain. (Gain correction can be important, since filters 38 and 40 are different.)

Alternatively, as illustrated in FIG. 2B, the subtraction may be carried out on the image sensor chip in the analog domain. For this purpose, regions 34 and 36 may have separate readout circuits, which are clocked so that each pixel in region 34 is read out at the same time as the corresponding pixel in region 36. (The clock rates may be adjusted for the difference in widths of the regions.) An analog component, such as a differential amplifier 46 on the integrated circuit chip of the image sensor serves as the subtracter in this case, subtracting the signal level in region 36 from the signal level of the corresponding pixel in region 34, so that the output from image sensor 30 is already corrected for ambient background.

To improve accuracy of the results, image sensor 30 may also comprise circuitry for performing local operations of optical flow and gain modification, to ensure that the image signals from regions 34 and 36 have locally the same point of view and gain.

Imaging Module with Wide Field of View

Figure 3A:
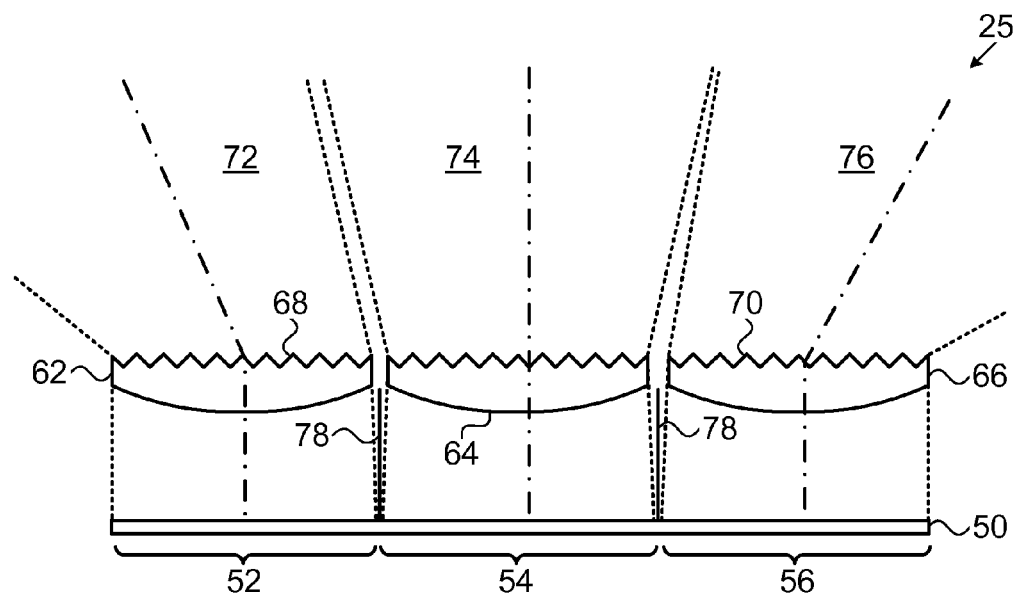
FIG. 3A is a schematic side view of an imaging module, in accordance with another embodiment of the present invention.
Figure 3B:
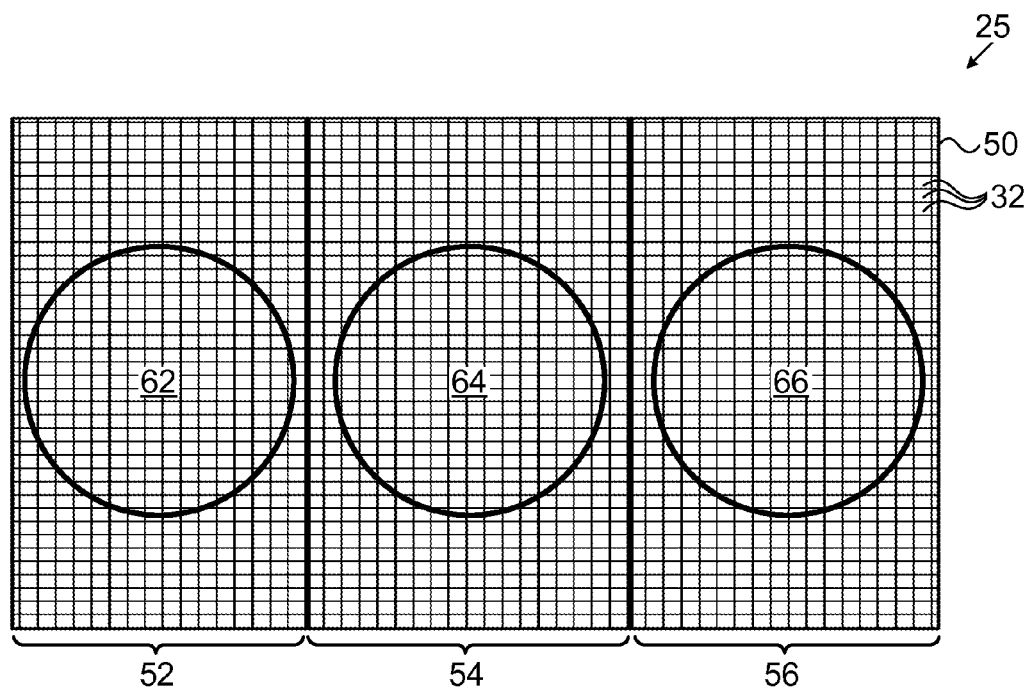
FIG. 3B is a schematic frontal view of the imaging module of FIG. 3A.

FIGS. 3A and 3B schematically illustrate an optical arrangement of imaging module 25 that provides a wide field of view (FOV) in a compact, low-cost optical design, in accordance with an embodiment of the present invention. FIG. 3A is a side view showing an image sensor 50 and other elements of module 25, while FIG. 3B is a frontal view. The principles of this embodiment may be combined with those of the embodiments of FIGS. 2A and 2B to give both wide FOV and ambient light rejection.

Image sensor 50 in this embodiment is divided into three regions 52, 54 and 56, each with its own lens 62, 64, 66. Image sensor 50 may be a standard CMOS device or CCD. The lenses in this case are assumed to be refractive, although diffractive or combinations of refractive and diffractive elements may alternatively be used for the same purpose. Furthermore, although the pictured embodiment divides the image sensor into only three regions with respective lenses, a smaller or larger number of regions and lenses may be used. In the embodiment shown in FIGS. 3A and 3B, lenses 62, 64 and 66 are arranged in a single row, thus expanding the FOV of module 25 in one direction only (the horizontal direction relative to the pages of these figures), but a two-dimensional array of lenses may likewise be used to expand the FOV in both horizontal and vertical directions.

Each of lenses 62, 64 and 66 has a respective FOV 72, 74, 76, as shown in FIG. 3A. At least two of the lenses, such as lenses 62 and 66, also have a diverting element, such as Fresnel prisms 68 and 70, fixed to one of their surfaces, such as the front surface in the pictured embodiment. These diverting elements deflect the respective optical axes of the lenses on the front side of module 25 (i.e., the side facing toward the scene and away from image sensor 50) angularly outward relative to the center of image sensor 50. The angle of deflection of prisms 68 and 70 is chosen so that fields of view 72 and 76 look outward and overlap only slightly at their inner borders with FOV 74.

As a result, module 25 has an overall FOV that is three times the width of the individual FOV of each of the lenses. Each of regions 52, 54 and 56 thus receives an image of a different part of the overall FOV, although it is possible that the images may overlap or that there may be gaps between the images. An image processor, such as computer 24 or a processor embedded in device 22, may process the electronic image output from sensor 50, if necessary, for proper blending and avoidance of artifacts at the borders between the regions. In order to prevent stray light from passing between the lenses, separator walls 78 may be interposed between the channels. Similar sorts of separators may be used in the other embodiments described herein (but they are omitted from the figures for the sake of simplicity).

Module 25 as shown in FIGS. 3A and 3B may achieve an overall FOV of 90-120° with good image quality throughout (at least sufficient for the purposes of system 20). Normally, good image quality over a FOV this wide requires a large, costly lens, extending a large distance forward from the image sensor. By using an array of lenses, on the other hand, the present embodiment achieves the same FOV with a much more compact, less costly design, and improved performance, since the FOV of each of lenses 62, 64, 66 is only one-third of the overall FOV. The use of diffractive technology for this purpose enables Fresnel prisms 68 and 70 to be fabricated as part of the lenses themselves and avoids the need for bulky refractive prisms or reflective elements.

Figure 4:
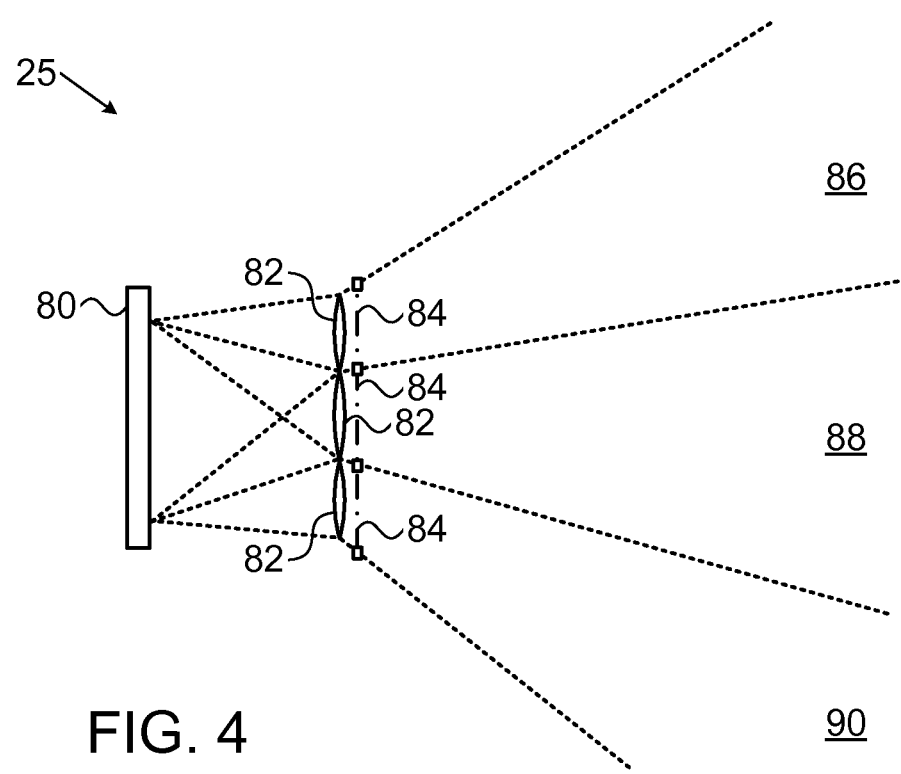
FIG. 4 is a schematic side view of an imaging module, in accordance with yet another embodiment of the present invention.

FIG. 4 is a schematic side view of an optical arrangement of imaging module 25 that provides a wide field of view (FOV) in a compact, low-cost optical design, in accordance with another embodiment of the present invention. In this embodiment, too, an array of lenses 82 images the scene of interest onto an image sensor 80, wherein each lens captures the image in a respective FOV 86, 88, 90, . . . . In this case, there are nine lenses 82 in a 3×3 array (although only three of the lenses are seen in the side view of FIG. 4), but again, larger or smaller numbers of lenses may be used in either a one- or two-dimensional array. Alternatively, a single imaging lens may be used, with a suitable arrangement of beam combiners to multiplex and superimpose all of FOVs 86, 88, 90, . . . , through this same lens.

In contrast to the preceding embodiment, in the present embodiment all of lenses 82 cast their respective images of different areas of the scene onto a common area (typically the entire area) of the array of detector elements 32 in sensor 80. Thus, each of FOVs 86, 88, 90, . . . is imaged with the full resolution of sensor 80. The signal output by the sensor, however, becomes a superposition of the images of all the individual fields of view. An image processor, such as computer 24 or a processor embedded in device 22, separates out the individual images by a process of matched filtering of the output signal from sensor 80, in order to reconstruct the specific images of the individual fields of view. These specific images may be stitched together or otherwise processed over the entire, combined FOV in order to provide an image with both wide FOV and high resolution.

The matched filtering performed by the image processor is based on optical encoding of the images formed by lenses 82 with different, respective coding patterns. Various means may be used to perform this encoding. For example, the individual image formed by each lens 82 may be optically encoded, using means such as a respective coded aperture 84 associated with the optical aperture of each lens 82. A coded aperture, as is known in the art, applies a predetermined spatial modulation to the incoming light, which may be either an amplitude modulation or a phase modulation or a combination of the two. The resulting individual image formed at the focus of the lens on image sensor 80 is then a convolution of the result of geometrical optical imaging with the Fourier transform of the aperture modulation function (representing the diffraction effects). Appropriate defocusing will thus cause a geometrical image of the aperture to appear as the image of a point source, and the modulated image will be a convolution of the aperture with the original unmodulated image.

A set of mutually-orthogonal modulation functions may be chosen, with a different one of the functions applied by each of the different apertures 84. The modulation functions are "mutually orthogonal" in the sense that the spatial correlation between any pair of the functions is insignificant by comparison to the autocorrelation of each function with itself. Each function will then have a different, respective deconvolution kernel, which serves as a matched filter for the image formed through the corresponding aperture 84. To extract the individual image formed by each of lenses 82, the image processor performs a succession of deconvolution operations using the respective kernels or alternatively solves simultaneously for all the individual images. The deconvolution of the individual images and reconstruction of the combined FOV can be performed frame by frame, without reliance on previous image frames or other temporal information.

As another alternative, projection module 23 may serve as the means for encoding the images by projecting a pattern chosen so that the respective partial patterns projected onto the scene in the different fields of view 86, 88, 90, . . . are mutually orthogonal. In this case, these partial patterns themselves can serve as the matched filters. The image processor may perform a correlation computation between the image output from sensor 80 and each of these partial patterns in order to extract the individual images of the partial patterns and find local pattern shifts as a function of position in each of the fields of view. The processor uses these pattern shifts in computing a depth map (with wide FOV), as described above.

As in the preceding embodiment, the use of the array of lenses 82, each with a moderate individual FOV, enables the system to achieve a wide overall FOV at low cost, while maintaining a compact optical configuration.

In an alternative embodiment, the optical arrangement shown in FIG. 4 can be used to provide a sort of "zoom" functionality in pattern detection and depth mapping. In this embodiment, projection module 23 initially projects a given pattern over the entire combined FOV of the array of lenses 82. The image processor processes all of the individual images, as described above, to give a wide-angle, low-resolution depth map. The image processor may identify an object of interest in a certain sector of this depth map, within one or more of fields of view 86, 88, 90, .... The image processor may then instruct projection module 23 to adjust its optical configuration so that the pattern is projected, possibly with higher resolution, only into the limited sector in which the object is located.

The dimensions of the projected pattern in this "zoom" mode are less than or equal to the dimensions of the FOV of a single lens 82, while the pattern itself may be contained within the FOV of a single lens or may overlap the fields of view of two or more of the lenses. As a result, imaging module 25 will receive a single image of the pattern, via one or more of lenses 82, without other superimposed images of the pattern as in the wide-angle mode. The image processor may process this individual image in order to create an enhanced-resolution depth map of the object of interest. Thus, system 20 has simultaneously large FOV and high resolution and is able to choose a high-resolution sub-image from within the large FOV.

Compact Pattern Projectors

When projection module 23 is required to project a pattern over a wide FOV, the projection lens may suffer from similar problems of size and cost as are encountered by the imaging lenses in the wide FOV imaging configurations described above. Furthermore, when coherent illumination is used, large, wide-angle projection lenses can exacerbate eye safety concerns. The embodiments described below address these issues.

Figure 5:
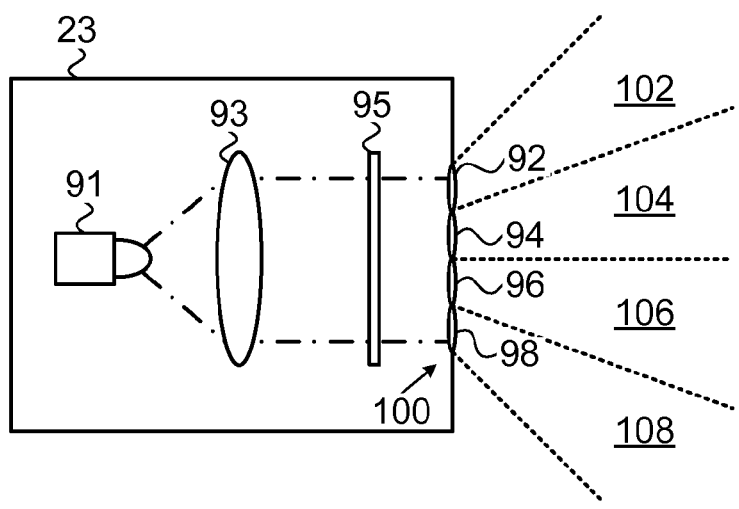
FIG. 5 is a schematic side view of a projection module, in accordance with an embodiment of the present invention.

FIG. 5 is a schematic side view of projection module 23, in accordance with an embodiment of the present invention. The module comprises a light source 91, such as a laser diode or LED. A condenser, such as a lens 93, collimates or gathers, shapes, and directs the beam of light emitted by the light source toward a transparency 95, which is interposed in the beam and typically creates a pattern of light and dark spots. Light source 91, lens and transparency 95 together serve as a patterned illumination source.

Transparency 95 may comprise any of a wide range of optical components. The transparency may comprise, for example, a gray-level or otherwise patterned optical element or a patterned microlens array (MLA), as described in the above-mentioned PCT International Publication WO 2008/120217, or any other suitable sort of patterned refractive of diffractive optical element (DOE).

The pattern created by this illumination source is projected onto the scene of interest by an array 100 of projection lenses 92, 94, 96, 98. These lenses each project a part of the overall pattern onto a respective FOV 102, 104, 106, 108, although there may be small overlaps or gaps between the respective parts of the pattern projected by the individual lenses. Thus, the lenses of array 100 together project the pattern onto a wide overall FOV, typically 120° wide or more, with each lens projecting its part of the pattern onto a different, respective area of the scene. The use of an array of small lenses of this sort makes module 23 smaller and, typically, less costly to manufacture, while improving the performance of the individual lenses and thus of the whole array. Although only one dimension of array 100 is shown in this figure, the projection lenses may be arrayed in two dimensions, i.e., into the page as well as vertically in the view presented here. Furthermore, although the lenses in FIGS. 5 and 6 are shown in the figures as simple lenses, in practice compound lenses may be used in all embodiments of projection module 23.

Figure 6:
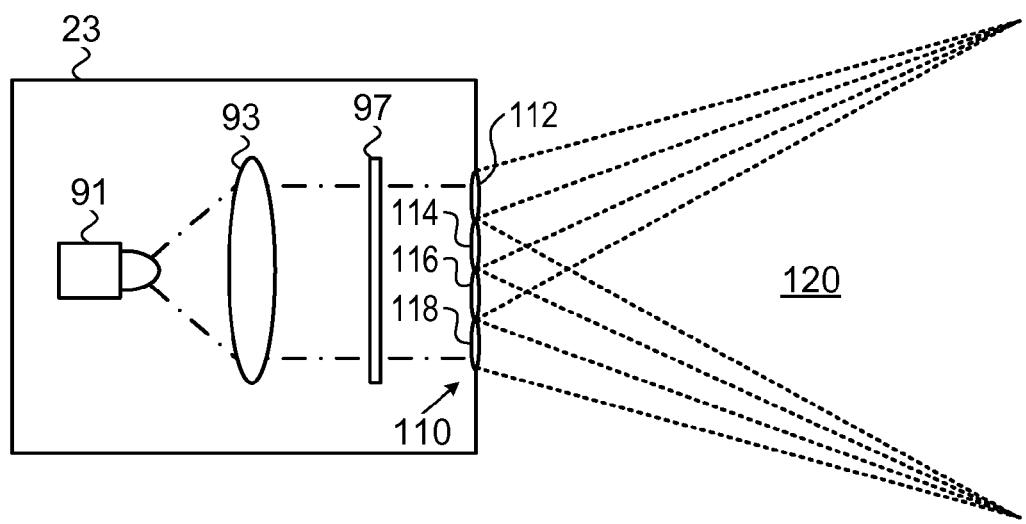
FIG. 6 is a schematic side view of a projection module, in accordance with another embodiment of the present invention.

FIG. 6 is a schematic side view of projection module 23 in accordance with another embodiment of the present invention. This embodiment shares the benefits of compactness, low cost, and improved performance with the preceding embodiment, while adding the benefit of enhanced eye safety. In this case, projection lenses 112, 114, 116, 118, ... in an array 110 are all configured to project respective parts of the pattern generated by an illumination source including a transparency 97 onto the same FOV 120. (Transparency 97 may comprise any of the types of transparencies mentioned above in reference to transparency 95.) Each of the projection lenses, in other words, projects its own pattern, generated by the corresponding part of transparency 97 (or equivalently, each of the lenses may be associated with its own pattern generating element) onto an area of the scene that is common to all of the lenses. The resulting pattern in FOV 120 is a superposition of all the individual patterns cast by the lenses. Intricate patterns can be created in this manner.

The eye safety is enhanced in this embodiment due to the following consideration: The light power that a projector can safely emit is defined by the AEL (Accessible Emission Limit). For an extended source, the AEL is proportional to the angular subtense of the source, referred to as $\alpha$, as well as by the f# of the projections lens, the FOV, and the area of the source (in this case the area of transparency 97). Maintaining the same area of transparency 97, the same f# for the projection lenses, and the same FOV, but dividing the projection lens into an array of n×n lenses, for example, will provide a factor of n increase in the AEL for the whole system. The reason for this increase is that the aperture of each lens has an angular subtense that is 1/n of the original angular subtense, but there are n×n such apertures, so that overall the system can project n times more power while maintaining the same level of eye-safety.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An imaging apparatus, comprising:
    an image sensor, comprising an array of detector elements arranged in rows and columns;
    objective optics, which are configured to focus optical radiation and are positioned so as to form respective first and second optical images of a scene on different, respective first and second regions of the array comprising respective first and second numbers of columns of the detector elements, such that the first number is greater than the second number, while the first and second regions have equal numbers of rows, so that the first region is wider than and has a different shape from the second region;
    first and second optical filters, having different respective first and second passbands, which are positioned so as to filter the optical radiation focused by the first and second lenses onto the first and second regions, respectively; and
    a subtracter, which is coupled to take a difference between respective first and second input signals provided by the detector elements in the first and second regions and to generate an output signal indicative of the difference.

2. The apparatus according to claim 1, wherein the objective optics are arranged so that the first and second optical images contain a common field of view.

3. The apparatus according to claim 1, wherein the objective optics comprise first and second lenses, which are configured to form the first and second optical images, respectively.

4. The apparatus according to claim 1, wherein the subtracter is configured to take the difference by subtracting digital pixel values from the first and second regions.

5. The apparatus according to claim 1, wherein the image sensor comprises an integrated circuit chip, and wherein the subtracter comprises an analog component on the chip.

6. The apparatus according to claim 1, and comprising a projection module, which is configured to project a pattern onto the scene at a wavelength in the first passband, while the optical radiation focused by the objective optics comprises ambient background radiation in both the first and second passbands, whereby the second input signal provides an indication of a level of the ambient background radiation for subtraction from the first input signal.

7. The apparatus according to claim 6, and comprising a processor, which is configured to process the output signal so as to generate a depth map of the scene responsively to the pattern appearing in the first optical image.

8. An imaging apparatus, comprising:
an image sensor, comprising an array of detector elements;
a plurality of lenses, which are configured to form respective optical images of different, respective portions of a scene on different, respective regions of the array along respective optical axes, wherein the lenses comprise at least:
 a single first lens, which is configured to form a first optical image on a first region of the array of the detector elements along a first optical axis; and
 a single second lens, which is configured to form a second optical image on a second region of the array of the detector elements along a second optical axis, which is different from the first optical axis; and
diverting elements, which are fixed to respective surfaces of at least two of the lenses and are configured to deflect the respective optical axes of the at least two of the lenses angularly outward in different, respective directions relative to a center of the image sensor, wherein the diverting elements comprise:
 a first diverting element, which is fixed to the single first lens and is configured to deflect the first optical axis angularly outward in a first direction relative to a center of the image sensor so as to image a first field of view onto the first region; and
 a second diverting element, which is fixed to the single second lens and is configured to deflect the second optical axis angularly outward in a different, second direction relative to the center of the image sensor so as to image a second field of view, different from the first field of view, onto the second region.

9. The apparatus according to claim 8, wherein the diverting elements comprise diffractive patterns that are fabricated on the respective surfaces of the at least two of the lenses.

10. The apparatus according to claim 9, wherein the diffractive patterns define Fresnel prisms.

11. The apparatus according to claim 8, wherein the apparatus comprises a processor, which is configured to process an output of the image sensor so as to generate an electronic image having a combined field of view encompassing the different, respective portions of the scene whose optical images are formed by the lenses.

12. The apparatus according to claim 11, and comprising a projection module, which is configured to project a pattern onto the scene, wherein the processor is configured to process the electronic image so as to generate a depth map of the scene responsively to the pattern appearing in the optical images of the respective portions of the scene.

13. The apparatus according to claim 8, wherein the lenses comprise a third lens, which is configured to form a third optical image along a third optical axis on a third region of the array of detector elements, such that the third region is located between the first and second regions and the third optical axis is located between the first and second optical axes, and
 wherein the third optical axis is undeflected, whereby the third lens images a third field of view, intermediate the first and second fields of view, onto the third region.

14. A method for imaging, comprising:
focusing optical radiation so as to form respective first and second optical images of a scene on different, respective first and second regions of an array of detector elements arranged in rows and columns,
wherein the first and second regions comprise respective first and second numbers of columns of the detector elements, such that the first number is greater than the second number, while the first and second regions have equal numbers of rows, so that the first region is wider than and has a different shape from the second region;
filtering the focused optical radiation with different, respective first and second passbands for the first and second regions; and
taking a difference between respective first and second input signals provided by the detector elements in the first and second regions so as to generate an output signal indicative of the difference.

15. The method according to claim 14, wherein focusing the optical radiation comprises forming the first and second optical images so as to contain a common field of view.

16. The method according to claim 14, wherein focusing the optical radiation comprises positioning first and second lenses to form the first and second optical images, respectively.

17. The method according to claim 14, wherein taking the difference comprises subtracting digital pixel values from the first and second regions.

18. The method according to claim 14, wherein the array of the detector elements is formed on an integrated circuit chip, and wherein taking the difference comprises subtracting the input signals using an analog component on the chip.

19. The method according to claim 14, and comprising projecting a pattern onto the scene at a wavelength in the first passband, while the optical radiation focused by the objective optics comprises ambient background radiation in both the first and second passbands, whereby the second input signal provides an indication of a level of the ambient background radiation for subtraction from the first input signal.

20. The method according to claim 19, and comprising processing the output signal so as to generate a depth map of the scene responsively to the pattern appearing in the first optical image.

21. A method for imaging, comprising:
positioning a plurality of lenses to form respective optical images of different, respective portions of a scene on different, respective regions of an array of detector elements along respective optical axes of the lenses, wherein the lenses comprise at least:

a single first lens, which is configured to form a first optical image on a first region of the array of the detector elements along a first optical axis; and a single second lens, which is configured to form a second optical image on a second region of the array of the detector elements along a second optical axis, which is different from the first optical axis; and fixing diverting elements to respective surfaces of at least two of the lenses so as to deflect the respective optical axes of the at least two of the lenses angularly outward in different, respective directions relative to a center of the array, wherein the diverting elements comprise:

a first diverting element, which is fixed to the single first lens and is configured to deflect the first optical axis angularly outward in a first direction relative to a center of the image sensor so as to image a first field of view onto the first region; and a second diverting element, which is fixed to the single second lens and is configured to deflect the second optical axis angularly outward in a different, second direction relative to the center of the image sensor so as to image a second field of view, different from the first field of view, onto the second region.

22. The method according to claim 21, wherein fixing the diverting elements comprise fabricating diffractive patterns on the respective surfaces of the at least two of the lenses.

23. The method according to claim 22, wherein the diffractive patterns define Fresnel prisms.

24. The method according to claim 21, wherein the method comprises processing an output of the image sensor so as to generate an electronic image having a combined field of view encompassing the different, respective portions of the scene whose optical images are formed by the lenses.

25. The method according to claim 24, and comprising projecting a pattern onto the scene, and processing the electronic image so as to generate a depth map of the scene responsively to the pattern appearing in the optical images of the respective portions of the scene.

* * * * *